March 12, 1946.    E. R. PRICE    2,396,386
PISTON
Filed April 28, 1944

INVENTOR
EARL R. PRICE
BY H. O. Clayton
ATTORNEY

Patented Mar. 12, 1946

2,396,386

UNITED STATES PATENT OFFICE 2,396,386

PISTON

Earl R. Price, South Bend, Ind., assignor to Bendix Aviation Corporation, South Bend, Ind., a corporation of Delaware Application April 28, 1944, Serial No. 533,108

2 Claims. (Cl. 309—4)

This invention relates in general to a piston construction and more particularly to a piston adapted for use in a pressure differential operated motor.

The principal object of my invention is to provide a piston of relatively few parts the seal member of said piston being of light weight material and serving only as a seal member and not to carry side loads.

Yet another object of my invention is to provide a piston effective to prevent the passage of the power fluid, whether it be a gas or a liquid, between the periphery of the piston and the cylinder wall.

Other objects and advantages of the invention will be readily apparent to those skilled in the art from the following description taken in connection with the accompanying drawing which represents preferred embodiments of my invention. After considering these embodiments skilled persons will understand that many variations may be made without departing from the principles disclosed; and I contemplate the employment of any structures, arrangements or modes of operation that are properly within the scope of the appended claims.

Figure 1:
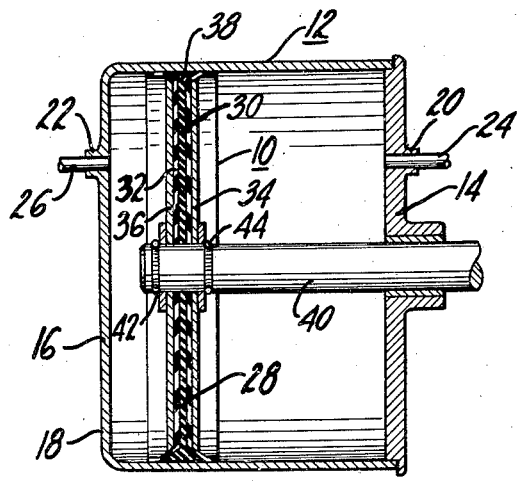
Figure 1 is a longitudinal sectional view through a double acting pressure differential operated motor including a piston constituting one embodiment of my invention.

There is disclosed in Figure 1 one embodiment of the piston constituting my invention said piston, indicated by the reference numeral 10, constituting the power element of a double-acting pressure differential operated motor indicated as a whole by the reference numeral 12. The end walls 14 and 16 of the cylinder 18 of the motor of Figure 1 are provided with fittings 20 and 22 respectively which are adapted to receive conduits 24 and 26 respectively connected to a control valve, not shown.

Describing now the details of the piston 10 of Figure 1 a center plate 28, preferably constructed of Bakelite or equivalent material which will not cause damage to the cylinder, is preferably made of a diameter to slide in direct contact with the cylinder wall. The use of such a center plate permits of the use of disk-shaped seal members 30 and 32 of a light weight material such as a linen or cotton based synthetic rubber said seal members being clamped against the center plate by plates 34 and 36 of steel or equivalent material. The center plate 28 of the piston of Figure 1 is preferably enlarged at its outer periphery to form an annular member 38 substantially triangular in section; and the slanted side walls of this member constitute supports for the seal members 30 and 32 which, by virtue of such support, need not be preformed. It is also to be noted that the support members 34 and 36 are beveled at their outer peripheries to complete the support for the peripheral portions of the light weight seal members. It is of course to be remembered that the seal of a conventional piston is usually preformed. Another feature of the piston construction of Figure 1 lies in the fact that with such a construction the seal members function solely as power fluid sealing members that is members to prevent the flow or rather leakage of air from one compartment of the motor to the other; they do not, as is true of most piston constructions, carry the side loads of the piston.

Completing the description of the power element that is piston 10 of Figure 1 the center plate 28, the yieldable seal members 30 and 32 and the support plates 34 and 36, together constituting the piston, are each provided with central openings registering with one another; and the piston as a whole is sleeved over the end of a connecting rod 40 of the motor and secured in place by split rings 42 and 44.

Figure 2:
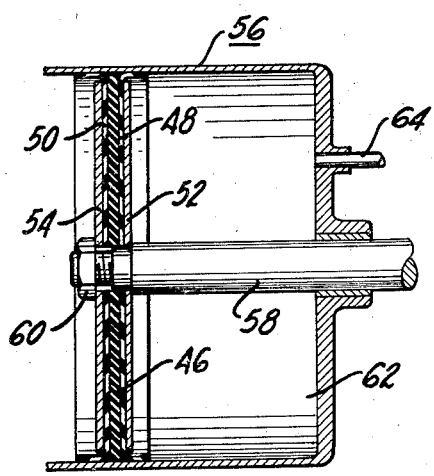
Figure 2 is a longitudinal sectional view through a single-acting pressure differential operated motor including a piston constituting another embodiment of my invention.

Referring now to that embodiment of piston construction disclosed in Figure 2 there is here provided a flat disk shaped center plate 46 of Bakelite or equivalent material and light weight seal members 48 and 50, of a cotton, canvas or linen based synthetic rubber, are clamped against the center plate by support plates 52 and 54. As with the center plate of Figure 1 the plate 46 at its outer periphery is in direct contact with the inner wall of the cylinder 56. In the piston construction of Figure 2 the seal members 48 and 50 are preferably slightly preformed; and this preforming is made necessary because of the absence of a peripheral support such as that provided for the seal members of the piston of Figure 1. Incidentally the preforming of the seals of Figure 2 aids in the assembly of the parts of the pistons.

The parts of the piston of Figure 2 are provided with central openings the piston being sleeved over a connecting rod 58 and secured to said rod by a nut 60. This nut of course serves to clamp the parts of the piston together as a unit. It is to be noted that the pressure differential operated motor of Figure 2 is a so-called single-acting motor wherein the gaseous pressure within the compartment 62 of the motor is controlled by a valve, not shown, incorporated in a conduit 64 interconnecting said conduit with a source of vacuum. The piston of Figure 2 is shown as including two seal members however by virtue of the excellent air seal provided by the seal member 50 the member 48 and the support member 52 may be omitted from the construction.

Figure 3:
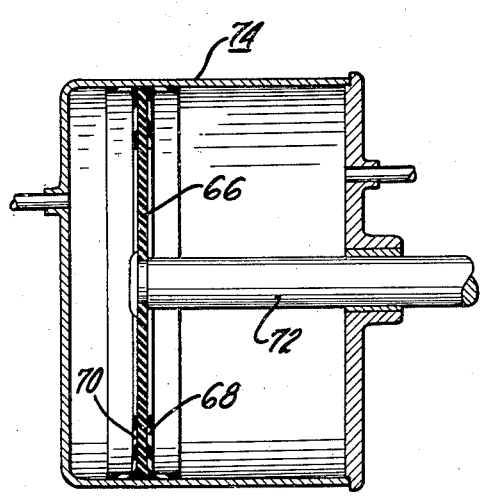
Figure 3 is a longitudinal view through a double-acting pressure differential operated motor including a piston constituting still another embodiment of my invention.

Referring now to Figure 3 disclosing a third embodiment of my invention there is here provided a piston comprising a flat center plate 66 of Bakelite or equivalent material and ring-like preformed seal members 68 and 70 cemented, molded or otherwise permanently secured to the sides of said plate. Incidentally the support plates 34 and 36 of the piston of Figure 1 might be omitted in which case the seal members 30 and 32 would then be cemented or molded directly to the center plate 28. The piston of Figure 3 is shown permanently secured to a connecting rod 72 slidable within one end of a motor 74.

There is thus provided, in the three embodiments of piston construction disclosed in Figures 1, 2 and 3, a very simple, compact, easily serviced and cheaply manufactured piston adapted for use in either a single-acting or double-acting pressure differential operated vacuum or air motor. The heart of my invention lies in the employment of the Bakelite center plate which slides in direct contact with the cylinder wall; for such a plate makes possible the use of a seal or seals of very light material with the attendant advantages explained above. Now the conventional piston includes at least six parts comprising a spring retainer and a spring expander which parts are made unnecessary by the above described piston constituting my invention.

Although particular embodiments of my invention have been described, it will be understood by those skilled in the art that the objects of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. A piston for use in a pressure differential operated motor including a cylinder member, said piston comprising a disk body member of Bakelite or equivalent material said body member being enlarged at its perimeter and of a diameter to have a sliding fit within the inner surface of the cylinder within which it is mounted, said piston further comprising two flexible seal members of reinforced synthetic rubber one of said members being positioned against each side face of the disk body member, each side face of the perimetric portion of the latter member being shaped to support the flexible seal member in contact therewith, and means for holding said seal members in position against the disk body member, the parts of the piston being so constructed and so arranged that there is provided a unit whose seal members function solely as a means for preventing a flow of power fluid from one side of the piston to the other when said piston is performing its function within a motor cylinder.

2. A piston for use in a pressure differential operated motor including a cylinder member, said piston comprising a disk body member of Bakelite or equivalent material said body member being enlarged at its perimeter and of a diameter to have a sliding fit within the inner surface of the cylinder within which it is mounted, said piston further comprising two flexible seal members of reinforced synthetic rubber one of said members being positioned against each side face of the disk body member, each side face of the perimetric portion of the said member being shaped to support the flexible seal member in contact therewith, and two disks for holding said flexible seal members in position against the disk body member each of the holding disks being shaped at their perimeter to nest within the corresponding portion of the aforementioned perimetric portion of the disk body member, a seal member being clamped between the perimetric portion of said disk body member and disk holding member, the parts of the piston being so constructed and arranged that there is provided a power element whose seal members function as a means for preventing a flow of power fluid from one side of the piston to the other and for that purpose only.

EARL R. PRICE.